United States Patent
Kawanishi

(10) Patent No.: US 8,502,912 B2
(45) Date of Patent: Aug. 6, 2013

(54) FOCUSING APPARATUS AND METHOD FOR CONTROLLING THE SAME

(75) Inventor: Atsuya Kawanishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 379 days.

(21) Appl. No.: 12/364,988

(22) Filed: Feb. 3, 2009

(65) Prior Publication Data

US 2009/0207298 A1 Aug. 20, 2009

(30) Foreign Application Priority Data

Feb. 19, 2008 (JP) ................... 2008-037422

(51) Int. Cl.
  *G03B 13/00* (2006.01)
  *H04N 5/232* (2006.01)

(52) U.S. Cl.
  USPC ........... 348/345; 348/348; 348/349; 348/351; 348/353; 348/354

(58) Field of Classification Search
  USPC .................. 348/345, 348, 349, 351, 353, 354
  See application file for complete search history.

(56) References Cited

U.S. PATENT DOCUMENTS

| | | | | |
|---|---|---|---|---|
| 5,767,989 A * | 6/1998 | Sakaguchi | .................... | 358/474 |
| 2004/0109081 A1* | 6/2004 | Sumi | ............................. | 348/345 |
| 2004/0119852 A1* | 6/2004 | Shin | .......................... | 348/240.2 |
| 2006/0072915 A1* | 4/2006 | Onozawa | ....................... | 396/121 |
| 2006/0182433 A1 | 8/2006 | Kawahara | | |
| 2007/0064145 A1* | 3/2007 | Sugimoto | ..................... | 348/345 |
| 2007/0160359 A1* | 7/2007 | Imamura | ....................... | 396/238 |
| 2009/0207298 A1* | 8/2009 | Kawanishi | ..................... | 348/345 |
| 2010/0321515 A1* | 12/2010 | Imamura | .................... | 348/222.1 |

FOREIGN PATENT DOCUMENTS

| | | | |
|---|---|---|---|
| JP | 2001-215403 A | 8/2001 | |
| JP | 2006-227080 A | 8/2006 | |

* cited by examiner

*Primary Examiner* — Antoinette Spinks
(74) *Attorney, Agent, or Firm* — Carter, DeLuca, Farrell & Schmidt LLP

(57) ABSTRACT

A focusing apparatus is configured to execute a focusing operation without using any auto-focus evaluation value obtained from an auto-focus evaluation value detection area set for an object other than that of an intended object when a plurality of objects is detected.

3 Claims, 12 Drawing Sheets

DURING DIRECTION DETERMINATION

DURING IN-FOCUS DETERMINATION

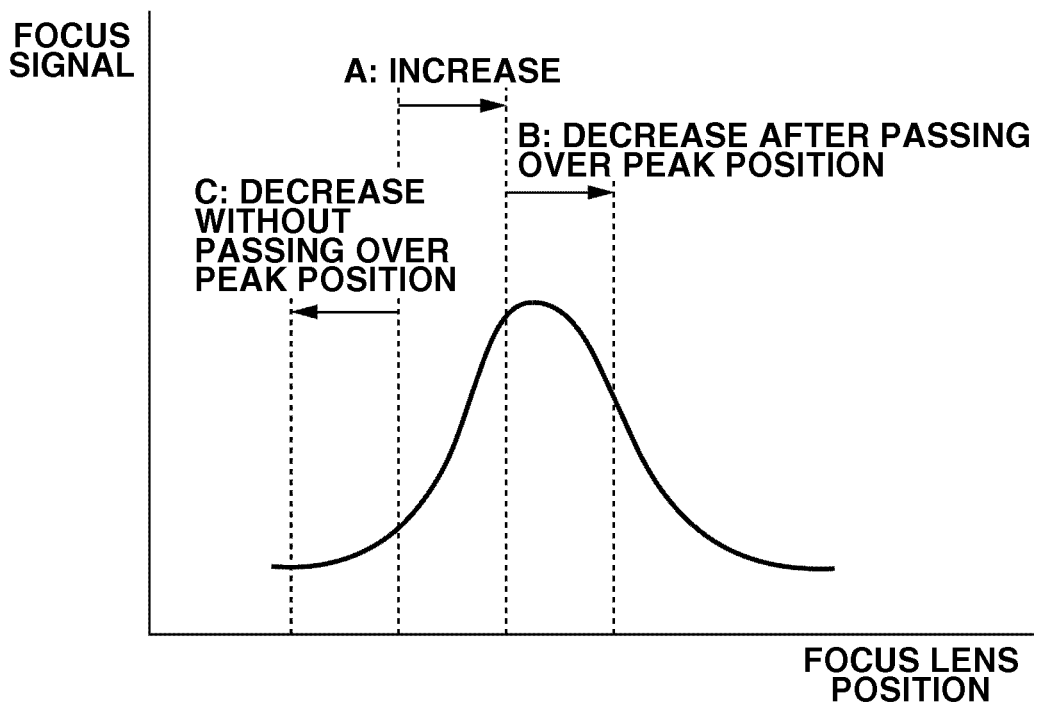

FOCUSING APPARATUS AND METHOD FOR CONTROLLING THE SAME

BACKGROUND OF THE INVENTION

1. Field of the Invention

The present invention relates to a focusing apparatus for auto-focusing on an object to be photographed based on the object information and a method for controlling the focusing apparatus.

2. Description of the Related Art

Conventionally, in a focusing apparatus included in a video camera or the like, the most commonly used method for auto-focusing is to detect an auto-focus (AF) evaluation value representing sharpness from an image signal obtained by photoelectrically converting an object image using an image sensor, and to control a focus lens position so as to maximize the AF evaluation value. Hereinafter, this focusing method is referred to as a television-auto focus (TV-AF) method.

However, using this TV-AF method, there has been a problem that does not focus on a person to be a main object but on a background with high contrast due to photographing conditions and object conditions. In order to solve this problem, an imaging apparatus with a face recognition function is known. Recently, a method of setting an AF area so as to contain a recognized face area to execute focus detection (Japanese Patent Application Laid-Open No. 2006-227080), a method of detecting eyes of a person to execute focus detection based on its result (Japanese Patent Application Laid-Open No. 2001-215403) and the like have been proposed.

In a focus detection method using the above-described face recognition function, an AF area is set to a face area when the face of a person is recognized and when it is not recognized, an AF area is set to be a predetermined area, thereby executing focus detection. Thus, when the face of a person is consistently recognized, focusing is stably performed on a person. However, practically, if a change in the object occurs, for example, when a person turns away, closes her/his eyes, or a camera shake during photographing occurs, accuracy of recognition of the face decreases. In the conventional method, under the conditions described above, since an area to detect an AF evaluation value is frequently changed between when a face is recognized and when it is not recognized, an AF evaluation value is significantly fluctuated. Thus, stable focusing cannot be obtained. Particularly, when taking a motion picture, the person to be photographed most probably keeps moving and the influence becomes more noticeable.

SUMMARY OF THE INVENTION

The present invention is directed to a focusing apparatus, an imaging apparatus, and its control method that are capable of maintaining a stable focusing condition when focusing on an object using an object detection function in a motion picture.

According to an aspect of the present invention, a focusing apparatus includes a detection unit configured to detect an object from a captured image, a setting unit configured to set an auto-focus area in the captured image at an area corresponding to the detected object, a focus detection unit configured to acquire an auto-focus evaluation value, which indicates a state of focus of an imaging optical system, based on an output signal from the auto-focus area, a determination unit configured to determine a direction to move the imaging optical system to focus on the detected object based on the auto-focus evaluation value, and a focusing unit configured to, when a plurality of objects is detected by the detection unit, combine auto-focus evaluation values obtained from a plurality of auto-focus areas except for an auto-focus area where the auto-focus evaluation value is increased by moving the imaging optical system in a direction different from a direction determined by the determination unit, and to execute focusing by moving the imaging optical system based on the combined auto-focus evaluation values.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 10 is a diagram illustrating a focus lens operation in a hill-climbing driving mode.

DETAILED DESCRIPTION OF THE EMBODIMENTS

Various exemplary embodiments, features, and aspects of the invention will be described in detail below with reference to the drawings.

In order to execute stable focusing control, it is effective to use an AF evaluation value in a preset area in combination with an AF evaluation value in a specific area of an object such as a face area. However, though a photographer generally disposes a main object in the center of a screen when photographing the main object, actually as an area indicated by a dotted line in an example in FIG. 2, faces other than the main object may be sometimes detected, which are located at the edge of a screen, in a background or the like. When a plurality of faces is detected like this, all the faces are not necessarily intended by a photographer. In particular, when photographed under the condition that a depth of field is small, if such a plurality of faces causes a perspective conflict or the like, there is a problem in which hunting or unstable movement can occur by being affected by information included in an unintentional face area.

Accordingly, a method will be described below, which realizes stable auto-focusing by using an AF evaluation value of a face area most suitably according to a number of detected faces and a driving state of a lens (for example, a direction determination mode, an in-focus determination mode).

Figure 1:
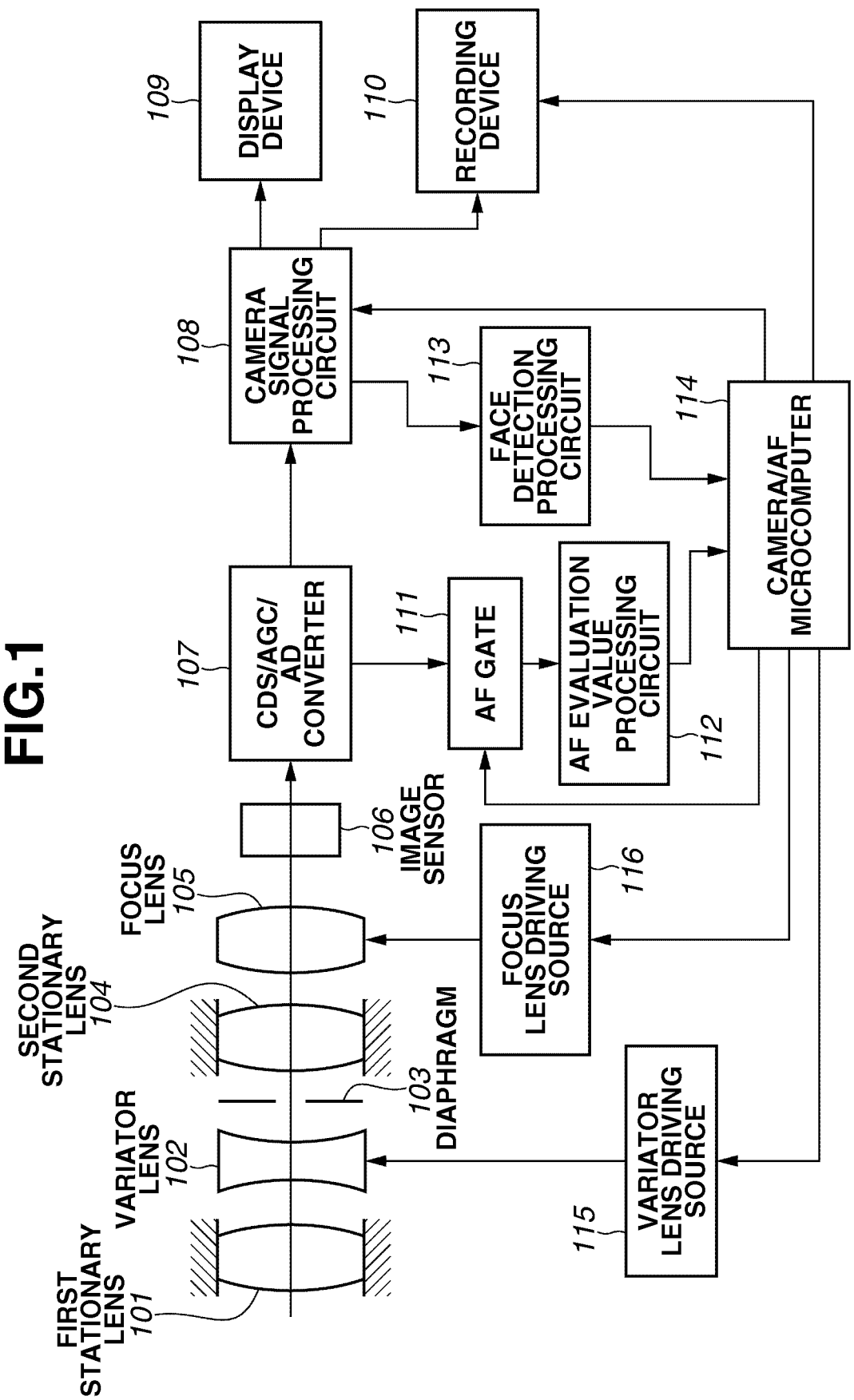
FIG. 1 is a block diagram illustrating a configuration of a video camera according to a first exemplary embodiment of the present invention.

FIG. 1 illustrates a configuration of a video camera according to a first exemplary embodiment of the present invention. Note that in the present exemplary embodiment, a video camera will be described. However, the present invention can also be applied to other focusing apparatuses included in a microscope and a digital still camera or the like.

In FIG. 1, an imaging optical system includes a first stationary lens 101 and a variator lens 102, which moves in a direction of an optical axis to perform zooming. The imaging optical system further includes a diaphragm 103, a second stationary lens 104, and a focus compensator lens 105 (hereinafter, referred to as focus lens 105), which includes both functions of correcting movement of a focal plane accompanied by zooming, and focusing. The movable range of the imaging optical system is predetermined.

An image sensor 106 is an image sensor configured, for example, with a charge coupled device (CCD) sensor or a complementary metal oxide semiconductor (CMOS) sensor, which includes a plurality of pixels each having a photoelectric conversion unit. By this pixel, an object image can be converted photoelectrically to obtain an electrical image to be captured. Further, a correlated double sampling (CDS)/automatic gain control (AGC)/analog-to-digital (AD) converter 107 executes sampling, gain control, and digitization of an output signal of the image sensor 106. In addition, a camera signal processing circuit 108 executes various kinds of image processing to the output signal from the CDS/AGC/AD converter 107 to generate an image signal. A display device 109 displays the image signal output from the camera signal processing circuit 108. A recording device 110 records the image signal output from the camera signal processing circuit 108 on a recording medium, such as a magnetic tape, an optical disk, and a semiconductor memory.

Figure 2:
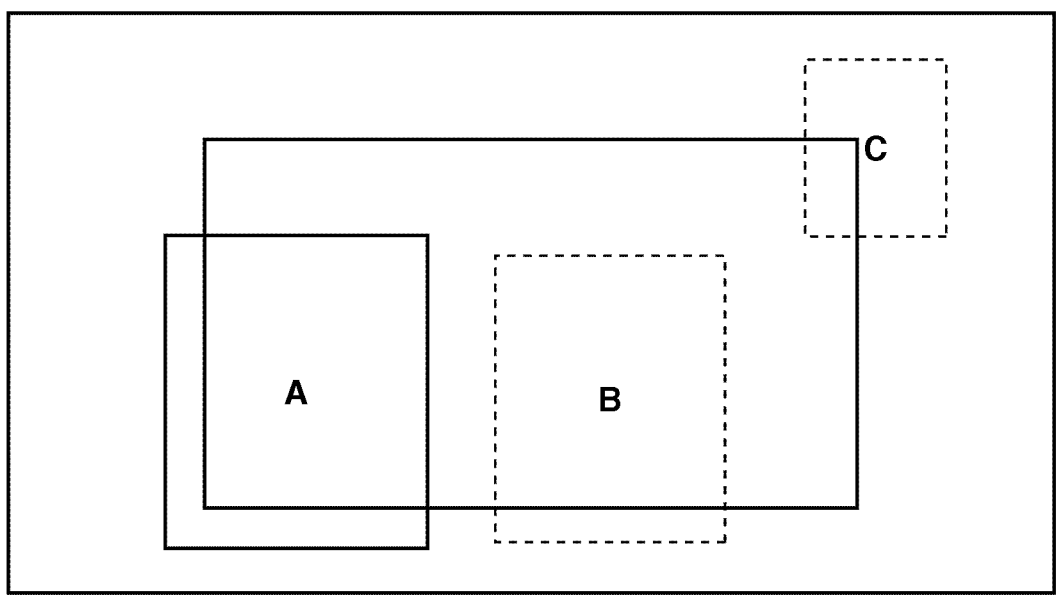
FIG. 2 is a diagram illustrating face frame positions when a plurality of faces is detected.
Figure 3:
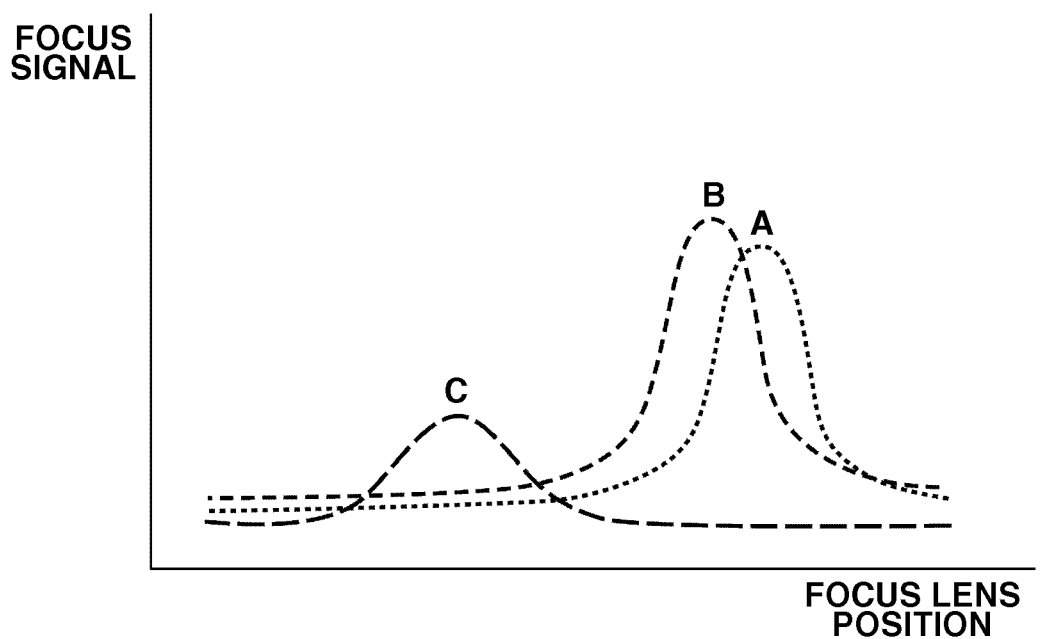
FIG. 3 is a diagram illustrating a state of an AF evaluation value for each face frame in an example in FIG. 2.

An AF gate 111 passes through only signals in an area, which are selected for focus detection from among output signals of all pixels output from the CDS/AGC/AD converter 107. An AF evaluation value processing circuit 112 extracts, from the signal passing through the AF gate 111, a high frequency component and a luminance difference component (difference between a maximum value and a minimum value of luminance levels of signals passing through the AF gate 111) generated from the high frequency component, to generate an AF evaluation value as first information. Here, an AF evaluation value represents sharpness (state of contrast) of an image generated based on an output signal from the image sensor 106. Since sharpness changes according to a focus state of an imaging optical system, the AF evaluation value indicates, consequently, a focus state of an imaging optical system. FIG. 3 illustrates a focus lens position and an AF evaluation value of areas A, B and C in an example in FIG. 2.

A face detection processing circuit 113 performs face recognition processing on an image signal to detect object information (size of a face, position, and reliability of a face candidate of a person). The face detection processing circuit 113 transmits the detected result to a camera/AF microcomputer 114 described below in detail. The camera/AF microcomputer 114 transmits information to the AF gate 111 so as to add an area to be used for focus detection in a position containing a face area in an image frame.

Note that the above-described face recognition processing includes, for example, a method of extracting a skin color area from a gray-scale color of each pixel represented by image data to detect a face by a degree of matching with a contour plate of a face prepared beforehand, and a method of performing pattern recognition from a feature point of a face such as an extracted eye, nose, mouth or the like.

The camera/AF microcomputer 114 controls a focus compensator lens driving source 116 (hereinafter, referred to as focus lens driving source 116), which is described later, to drive the focus lens 105 and also outputs an image recording command to the recording device 110 based on an output signal of the AF evaluation value processing circuit 112. A variator lens driving source 115 includes an actuator and a driver for moving the variator lens 102. The focus lens driving source 116 includes an actuator and a driver for moving the focus lens 105. The variator lens driving source 115 and the focus lens driving source 116 include an actuator such as a stepping motor, a direct current (DC) motor, a vibration type motor, and a voice coil motor.

Next, an outline of focusing control to be executed by the camera/AF microcomputer 114 will be described referring to FIGS. 5 to 8.

Figure 5:
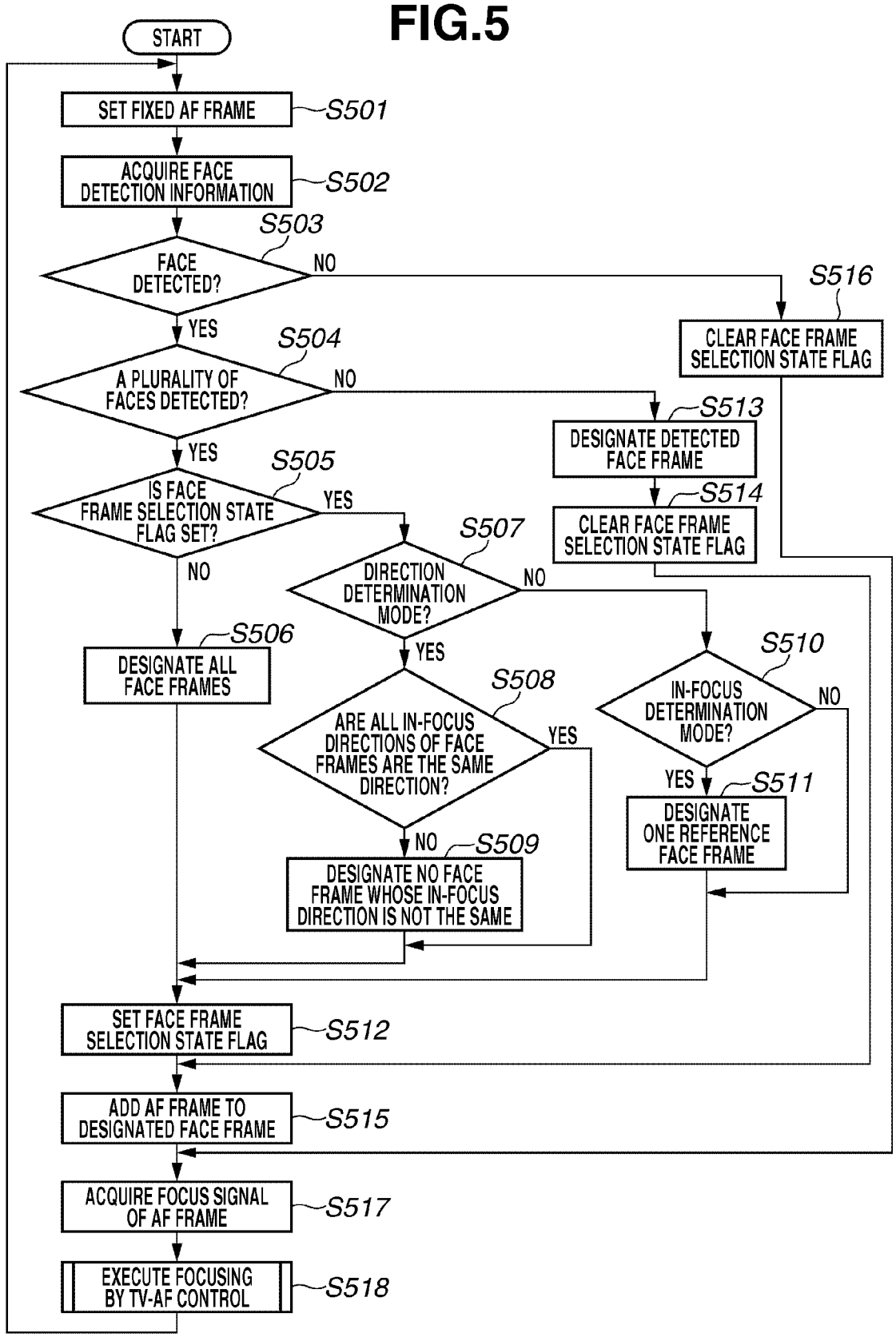
FIG. 5 is a flowchart illustrating setting of an AF area.

In FIG. 5, in step S501, the camera/AF microcomputer 114 sets a position and a size of a fixed AF area in order to acquire an AF evaluation value, which is used as a basis for TV-AF control, from the AF evaluation value processing circuit 112. This fixed AF area is different from an AF area to be set to a face frame and, for example, is set to an area, which is not based on a result obtained based on a face recognition processing by the face detection processing circuit 113. Hereinafter, an area including a position corresponding to the detected face is referred to as a face frame. Further, as another examples, the fixed AF area may be set to an area that is larger than an AF area to be set for a face frame and may contain an area of the AF area. Furthermore, at this time, the camera/AF microcomputer 114 sets a filter factor in the AF evaluation value processing circuit 112 and constructs a plurality of band-pass filters, which are different in extraction characteristics to each other. The extraction characteristics are frequency characteristics of a band-pass filter, and setting means changing a set value of a band-pass filter in the AF evaluation value processing circuit 112.

In step S502, the camera/AF microcomputer 114 acquires information on the result of face detection processing from the face detection processing circuit 113.

In step S503, the camera/AF microcomputer 114 determines whether a face is detected from the information acquired in step S502. If a face is detected (YES in step S503), the processing proceeds to step S504 and if a face is not detected (NO in step S503), the processing proceeds to step S516.

In step S504, the camera/AF microcomputer 114 determines whether a plurality of faces is detected from the information acquired in step S502. If a plurality of faces is detected (YES in step S504), the processing proceeds to step S505 and if a plurality of faces is not detected (NO in step S504), the processing proceeds to step S513.

In step S505, the camera/AF microcomputer 114 determines whether a flag, which indicates a face frame selection state that is set in step S512 described later, is set. If a flag is set (YES in step S505), the processing proceeds to step S507, and if it is not set (NO in step S505), the processing proceeds to step S506. Herein, the state of face frame selection means that some face frames are selected, each AF evaluation value of which is to be monitored, from among a plurality of detected face frames. The state of face frame selection continues over a period of time while the plurality of face frames is detected.

In step S506, the camera/AF microcomputer 114 designates all the detected face frames each as a monitoring target of an AF evaluation value based on the information acquired in step S502. In the case of the example in FIG. 2, all the detected face frames A, B and C are under monitoring of an AF evaluation value.

In step S507, the camera/AF microcomputer 114 determines whether a control state of TV-AF, described later, is a direction determination mode. If it is a direction determination mode (YES in step S507), the processing proceeds to step S508, and if it is not the direction determination mode (NO in step S507), the processing proceeds to step S510.

In step S508, the camera/AF microcomputer 114 determines each of a direction in which an AF evaluation value detected in each face frames increases. If the directions in all the face frames coincide with each other (YES in step S508), the processing proceeds to step S512, and if the directions do not coincide with each other (NO in step S508), the processing proceeds to step S509. Herein, a direction agreed by more face frames is determined to be an in-focus direction. However, when the number of face frames determined to be an infinite distance direction is equal to the number of face frames determined to be a closest distance direction, a direction, in which an AF evaluation value of a reference face frame increases, which is described later, is determined to be an in-focus direction.

Figure 4A:
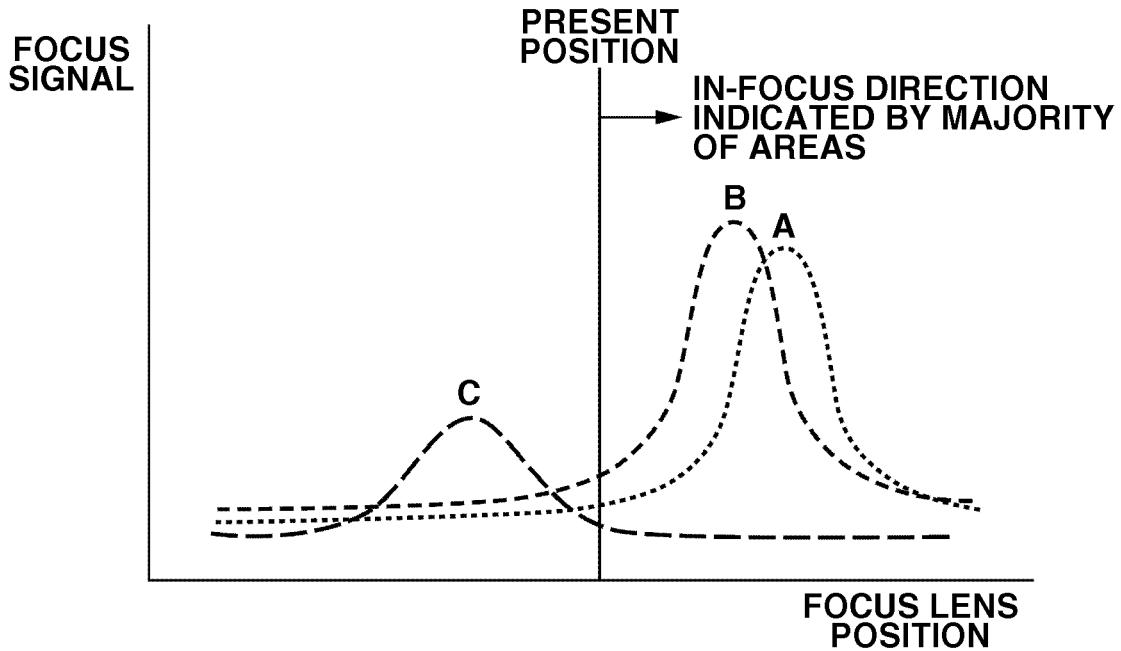
FIGS. 4A and 4B are diagrams illustrating a state of an AF evaluation value for each face frame according to a control state.
Figure 4B:
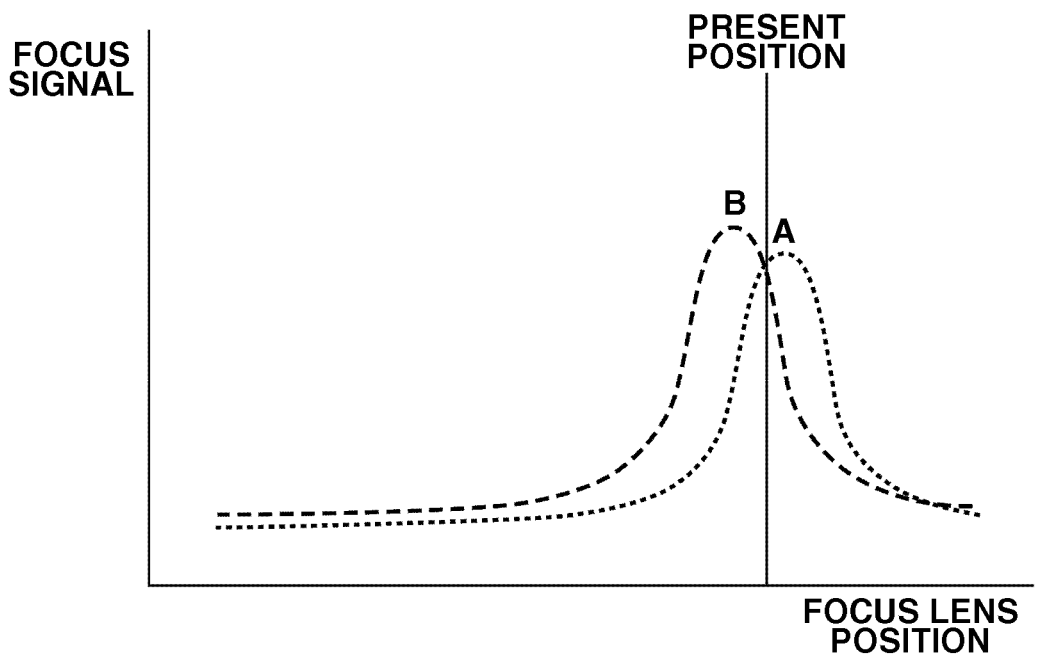

In step S509, the camera/AF microcomputer 114 does not designate a face frame determined that an in-focus direction does not coincide with that of the monitoring target of an AF evaluation value in step S508 thereafter. In other words, thereafter, the camera/AF microcomputer 114 moves an imaging optical system and executes focusing based on an AF evaluation value of a face frame except for a face frame with a reverse direction to that of the monitoring targets in AF evaluation value. In the case of the example in FIG. 2, as shown in FIG. 4A, an in-focus direction of face frames A and B coincides with each other in an in-focus direction indicated by the majority of face frames, while an in-focus direction of a face frame C does not coincide therewith. Thus, thereafter the face frame C is not used as a monitoring target of an AF evaluation value (refer to FIG. 4B).

In step S510, the camera/AF microcomputer 114 determines whether a control state of TV-AF, which is described later, is an in-focus determination mode. If it is an in-focus determination mode (YES in step S510), the processing proceeds to step S511, and if it is not an in-focus determination mode (NO in step S510), the processing proceeds to step S512.

In step S511, the camera/AF microcomputer 114 finally designates one reference face frame for focusing. A condition to be satisfied to be designated as a reference face frame includes the face frame that has a maxim area, positions in a center, includes a face located at a closest distance, or the like. For example, if the condition is set to be a frame that has a maximum area, a face frame A is selected as a target in the example in FIG. 2. Further, if the condition is set to be a frame that positions in a nearest position to a center, the face frame B is selected as a target in the example in FIG. 2. Thus, when focusing operation is performed, a desired main object can be focused by decreasing a number of face frames to obtain an AF evaluation value and by using only an appropriate face frame.

In step S512, the camera/AF microcomputer 114 sets a flag indicating the above-described face frame selection state at present and keeps the face frame selection state.

In step S513, the camera/AF microcomputer 114 designates the detected face frame as a monitoring target of an AF evaluation value based on the information acquired in step S502.

In step S514, the camera/AF microcomputer 114 clears a flag indicating the above-described face frame selection state and cancels the state of face frame selection.

In step S515, the camera/AF microcomputer 114 sets an AF area, to a face frame that is designated at present, in order to acquire an AF evaluation value.

In step S516, the camera/AF microcomputer 114 clears a flag indicating the above-described face frame selection state and cancels the state of face frame selection.

In step S517, the camera/AF microcomputer 114 acquires an AF evaluation value of an AF area set in step S501 or step S515. Here, each of the acquired AF evaluation value is added (combined) in a predetermined ratio, and is used for the following focusing control. Note that in the present exemplary embodiment, an AF evaluation value in each face frame is stored in a memory as a history. This is because tracing a history and re-combining an AF evaluation value can be performed when a face frame for control changes.

In step S518, the camera/AF microcomputer 114 executes focusing by TV-AF control. Detailed operation in this step will be described in FIG. 6. Thereafter, the processing returns to step S501.

Figure 6:
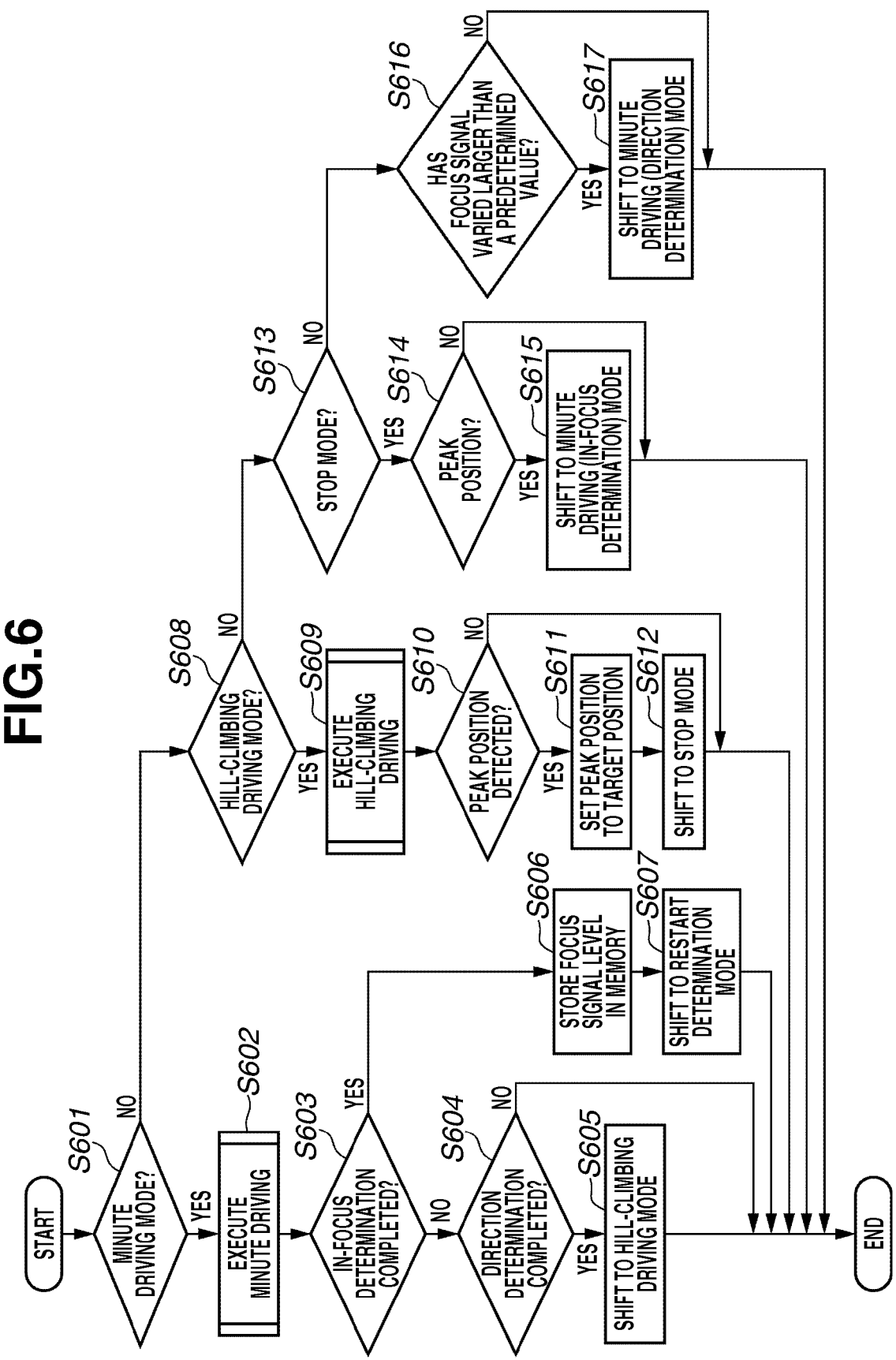
FIG. 6 is a flowchart illustrating TV-AF control.

In FIG. 6, in step S601, the camera/AF microcomputer 114 determines whether a AF driving mode is a minute driving mode. If it is a minute driving mode (YES in step S601), the processing proceeds to step S602, and if it is not a minute driving mode (NO in step S601), the processing proceeds to step S608.

In step S602, the camera/AF microcomputer 114 executes minute driving operation, drives a focus lens at a predetermined amplitude, and determines whether the object image is in-focus or in which direction an in-focus point is present. Detailed operation in this step will be described referring to FIG. 7 later below.

In step S603, the camera/AF microcomputer 114 determines whether in-focus determination is completed with the minute driving operation in step S602. If in-focus determination is completed with the minute driving operation (YES in step S603), the processing proceeds to step S606. If it is not completed (NO in step S603), the processing proceeds to step S604.

In step S604, the camera/AF microcomputer 114 determines whether direction determination is completed with the minute operation in step S602. If direction determination is completed (YES in step S604), the processing proceeds to step S605 and shifts to hill-climbing operation, and if it is not completed (NO in step S604), the processing returns to step S601 and continues the minute driving mode.

In step S606, the level of an AF evaluation value when in focus is stored in a memory, then the processing proceeds to step S607. In step S607, the camera/AF microcomputer 114 shifts the operation mode to a restart determination mode. The restart determination mode refers to a flow (illustrated in steps S616 and S617), in which it is determined whether minute driving (direction determination) is executed again.

In step S608, the camera/AF microcomputer 114 determines whether an AF mode is a hill-climbing driving mode. If it is the hill-climbing driving mode (YES in step S608), the processing proceeds to step S609, and if it is not the hill-climbing driving mode (NO in step S608), the processing proceeds to step S613.

In step S609, the camera/AF microcomputer 114 executes the hill-climbing driving operation to move the focus lens 105 at a predetermined speed in a direction in which AF evaluation value increases. Detailed operation in this step will be described in FIG. 8.

In step S610, the camera/AF microcomputer 114 determines whether a peak position of an AF evaluation value is detected based on hill-climbing driving operation in step S609. If a peak position of an AF evaluation value is detected (YES in step S610), the processing proceeds to step S611, and if it is not detected (NO in step S610), the processing returns to step S601 and continues a hill-climbing driving mode. Herein, in step S615, if it is determined that a peak position is detected in step S610, the focus lens 105 moves to a peak position, then the AF driving mode changes to an in-focus determination mode. At this time, if the in-focus determination of the AF evaluation value of the selected face frame temporarily could not be made because the hill-climbing operation was just being performed, minute driving is repeatedly performed and a lot of time is wasted. Thus, when a minute driving mode for in-focus determination is repeatedly executed more than predetermined time, the processing may be shifted to a restart determination mode. Then, in step S511, a face frame for focusing control is reduced to one.

In step S611, the camera/AF microcomputer 114 sets a focus lens position, as a target position, where an AF evaluation value reached a peak value, then, the processing proceeds to step S612 and shifts the operation mode to a stop mode. Then, the processing ends.

In step S613, the camera/AF microcomputer 114 determines whether it is in a stop mode. If it is in a stop mode (YES in step S613), the processing proceeds to step S614, and if it is not the stop mode (NO in step S613), the processing proceeds to step S616.

In step S614, the camera/AF microcomputer 114 determines whether a focus lens 105 has returned to a position where a peak of an AF evaluation value was obtained. If the focus lens 105 has returned to the position (YES in step S614), the processing proceeds to step S615 and shifts the operation mode to the minute driving (in-focus determination) mode in step S615, and if the focus lens 105 has not returned to the position (NO in step S614), the processing returns to step S601 and continues a stop mode.

In step S616, the camera/AF microcomputer 114 compares the level of an AF evaluation value at present and the level of an AF evaluation value held in step S606, and determines whether the difference is larger than a predetermined value. In this step, if the camera/AF microcomputer 114 determines that the difference is larger than a predetermined value (YES in step S616), the processing proceeds to step S617 and shifts the operation mode to the minute driving (direction determination) mode, and if the difference is not larger (NO in step S616), the processing returns to step S601 and continues a restart determination mode.

Figure 7:
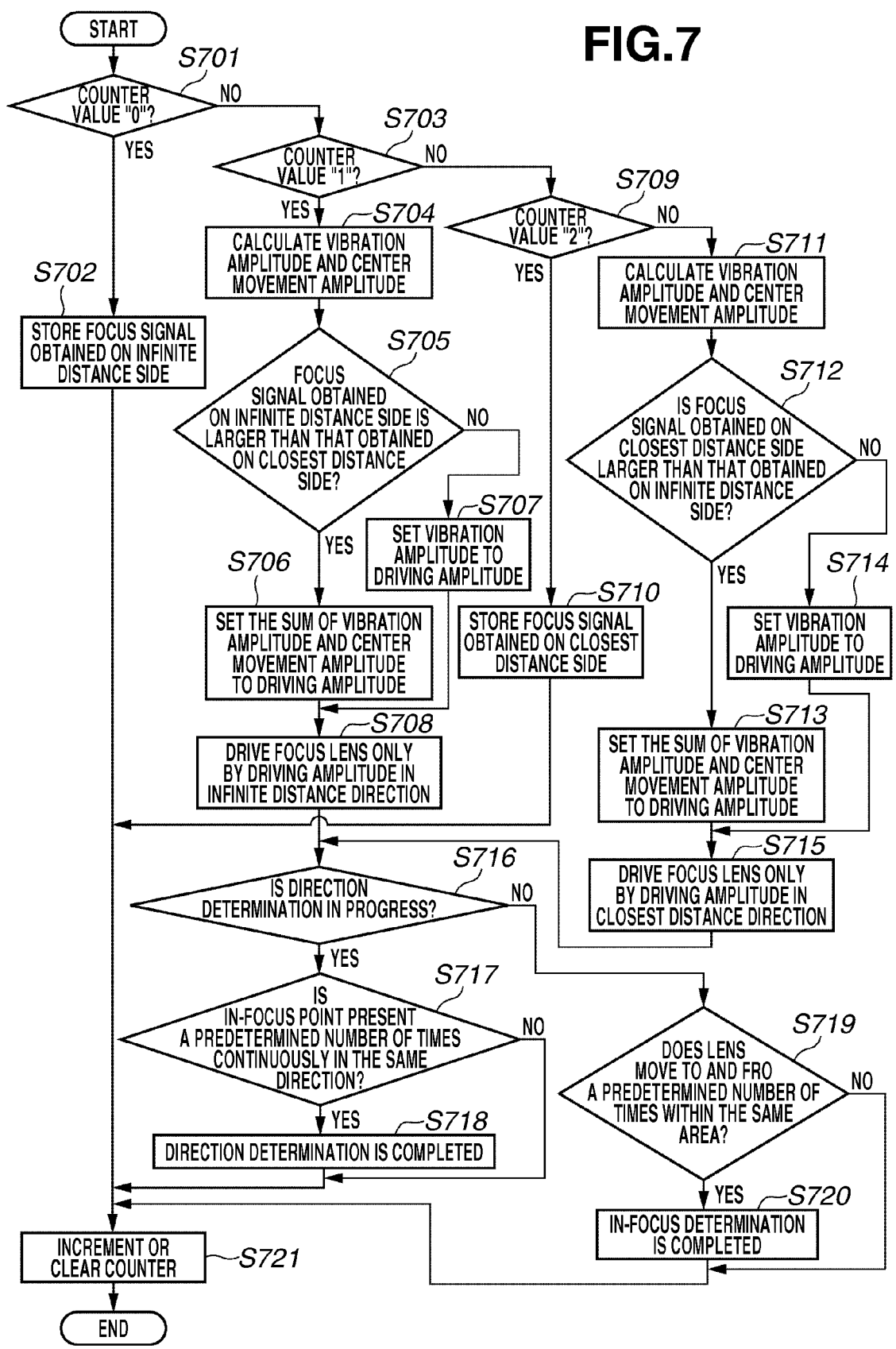
FIG. 7 is a flowchart illustrating a minute driving mode.

In FIG. 7, in step S701, the camera/AF microcomputer 114 determines whether a counter value, which indicates an operation state of the minute driving, is "0" at present. If it is "0" (YES in step S701), the processing proceeds to step S702 and if it is not "0" (NO in step S701), the processing proceeds to step S703. In step S702, as processing when the focus lens 105 positions on the closest distance side, the camera/AF microcomputer 114 holds the level of an AF evaluation value at present. The AF evaluation value in this step is obtained by an image signal generated from the electric charge accumulated in the image sensor 106 when the focus lens 105 positions on the infinite distance side in step S710 described later.

In step S703, the camera/AF microcomputer 114 determines whether a counter value at present is "1". If the counter value is "1" (YES in step S703), the processing proceeds to step S704 and if it is not "1" (NO in step S703), the processing proceeds to step S709. In step S704, the camera/AF microcomputer 114 calculates vibration amplitude and center movement amplitude in order to drive the focus lens 105 in step S708 described later. These amplitudes are generally set within the depth of focus. In step S705, the camera/AF microcomputer 114 compares the level of an AF evaluation value obtained when the focus lens 105 has positioned on the infinite distance side, which is held in step S702, and the level of an AF evaluation value obtained when the focus lens 105 has positioned on the closest distance side, which is held in step S710 described later. If the former is larger than the latter (YES in step S705), the processing proceeds to step S706, and if the latter is larger than the former (NO in step S705), the processing proceeds to step S707.

In step S706, the vibration amplitude and the center movement amplitude are added to be set as driving amplitude. In step S707, the vibration amplitude is set to be the driving amplitude. In step S708, the camera/AF microcomputer 114 drives the focus lens 105 in an infinite distance direction based on the driving amplitude determined in step S706 or step S707.

In step S709, the camera/AF microcomputer 114 determines whether a counter value at present is "2". If it is "2" (YES in step S709), the processing proceeds to step S710 and if it is not "2" (NO in step S709), the processing proceeds to step S711. In step S710, as processing when the focus lens 105 positions on the infinite distance side, the level of an AF evaluation value at present is held. An AF evaluation value in this step is obtained based on an image signal generated from electric charge accumulated in the image sensor 106 when the focus lens 105 has been present on the closest distance side in step S702.

In step S711, the camera/AF microcomputer 114 calculates vibration amplitude and center movement amplitude, which are used to drive the focus lens 105 in step S715 described later. These amplitudes are generally set within the depth of focus. In step S712, the camera/AF microcomputer 114 compares the level of an AF evaluation value when the focus lens 105 has positioned on the closest distance side held in step S710 and the level of an AF evaluation value when the focus lens 105 has positioned on the infinite distance side held in step S702. If the former is larger than the latter (YES in step S712), the processing proceeds to step S713, and if the latter is larger than the former (NO in step S712), the processing proceeds to step S714. In step S713, vibration amplitude and center movement amplitude are added to be set as driving amplitude. In step S714, vibration amplitude is set to be driving amplitude. In step S715, the camera/AF microcomputer 114 drives the focus lens 105 in a closest distance direction based on the driving amplitude determined in step S713 or step S714.

In step S716, the camera/AF microcomputer 114 determines whether it is a direction determination mode. If it is the direction determination mode (YES in step S716), the processing proceeds to step S717, and if it is not the direction determination mode (NO in step S716), the processing proceeds to step S719.

In step S717, the camera/AF microcomputer 114 determines whether an in-focus point positions a predetermined number of times continuously in the same direction. If the in-focus point positions a predetermined number of times continuously in the same direction (YES in step S717), the processing proceeds to step S718 and if not (NO in step S717), the processing proceeds to step S721. In step S718, the camera/AF microcomputer 114 determines that direction determination is completed.

In step S719, the camera/AF microcomputer 114 determines whether a focus lens moves to and fro a predetermined number of times in the same area. If the focus lens 105 has moved to and fro a predetermined number of times (YES in step S719), the processing proceeds to step S720 and if the focus lens 105 has not moved to and fro a predetermined number of times (NO in step S719), the processing proceeds to step S721. In step S720, the camera/AF microcomputer 114 determines that in-focus determination is completed.

In step S721, when a counter value indicating an operation state of minute driving is "3", a counter value is reset to "0", and when it is other than "3", a counter is incremented.

Figure 9:
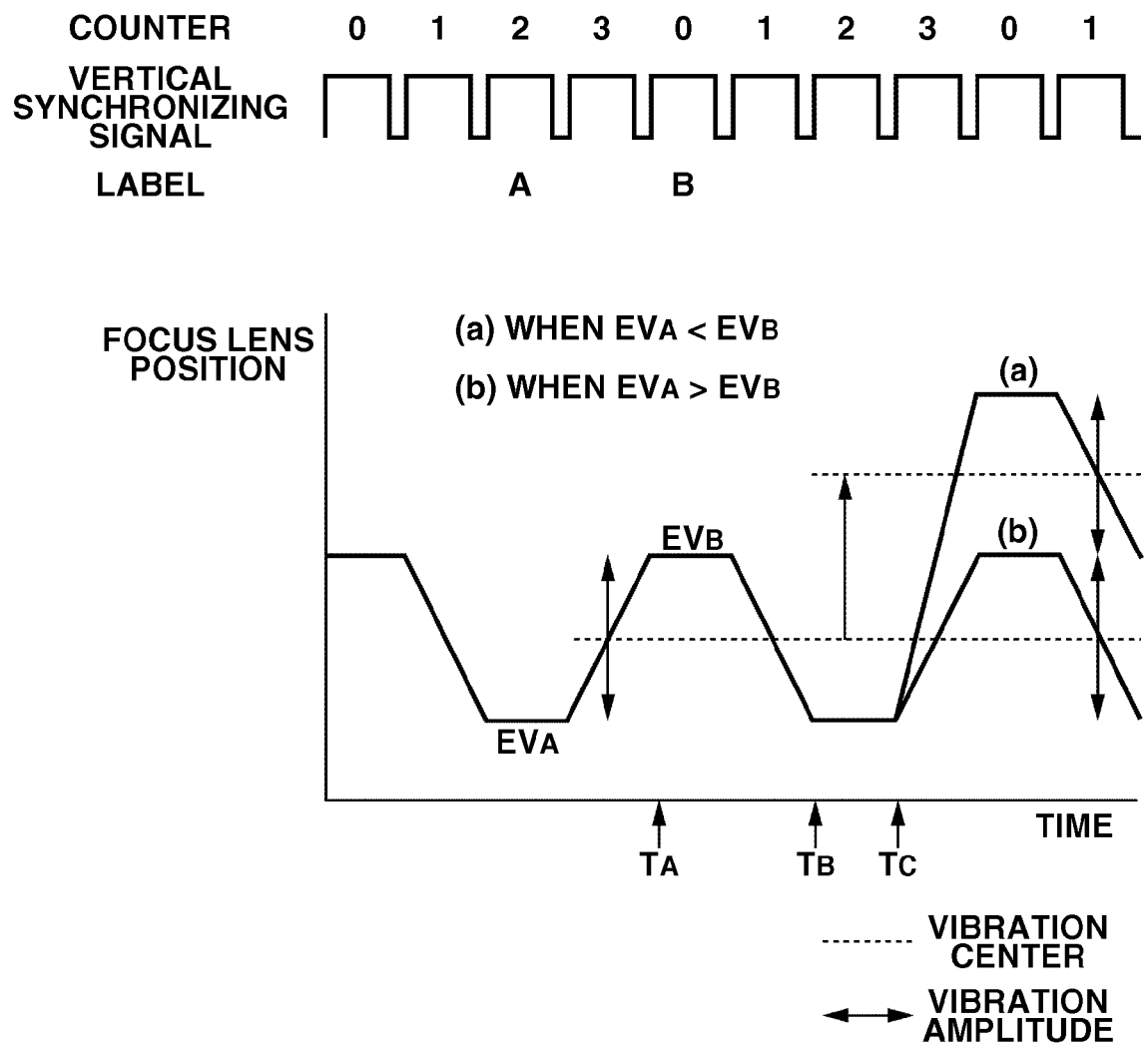
FIG. 9 is a diagram illustrating a focus lens operation in a minute driving mode.

A relationship between the focus lens operation while in the minute driving mode and the lapse of time is illustrated in FIG. 9. The signal illustrated at the top in FIG. 9 is a vertical synchronizing signal of an image signal. At the bottom in FIG. 9, an abscissa axis represents time and a vertical axis represents a position of the focus lens 105. An AF evaluation value $EV_A$, which is obtained from electric charge accumulated in the image sensor 106 at a time of a label A is input in the camera/AF microcomputer 114 at a time $T_A$. An AF evaluation value $EV_B$, which is obtained from electric charge accumulated in the image sensor 106 at a time of a label B is input in the camera/AF microcomputer 114 at a time $T_B$. At a time $T_C$, the camera/AF microcomputer 114 compares the AF evaluation value $EV_A$ and the AF evaluation value $EV_B$. Only when the AF evaluation value $EV_B$ in FIG. 9 is larger than the AF evaluation value $EV_A$, the camera/AF microcomputer 114 changes a vibration center. Note that in this step, the change of the vibration center of the focus lens 105 is sets to be within the depth of focus so that the change cannot be recognized on a screen.

Figure 8:
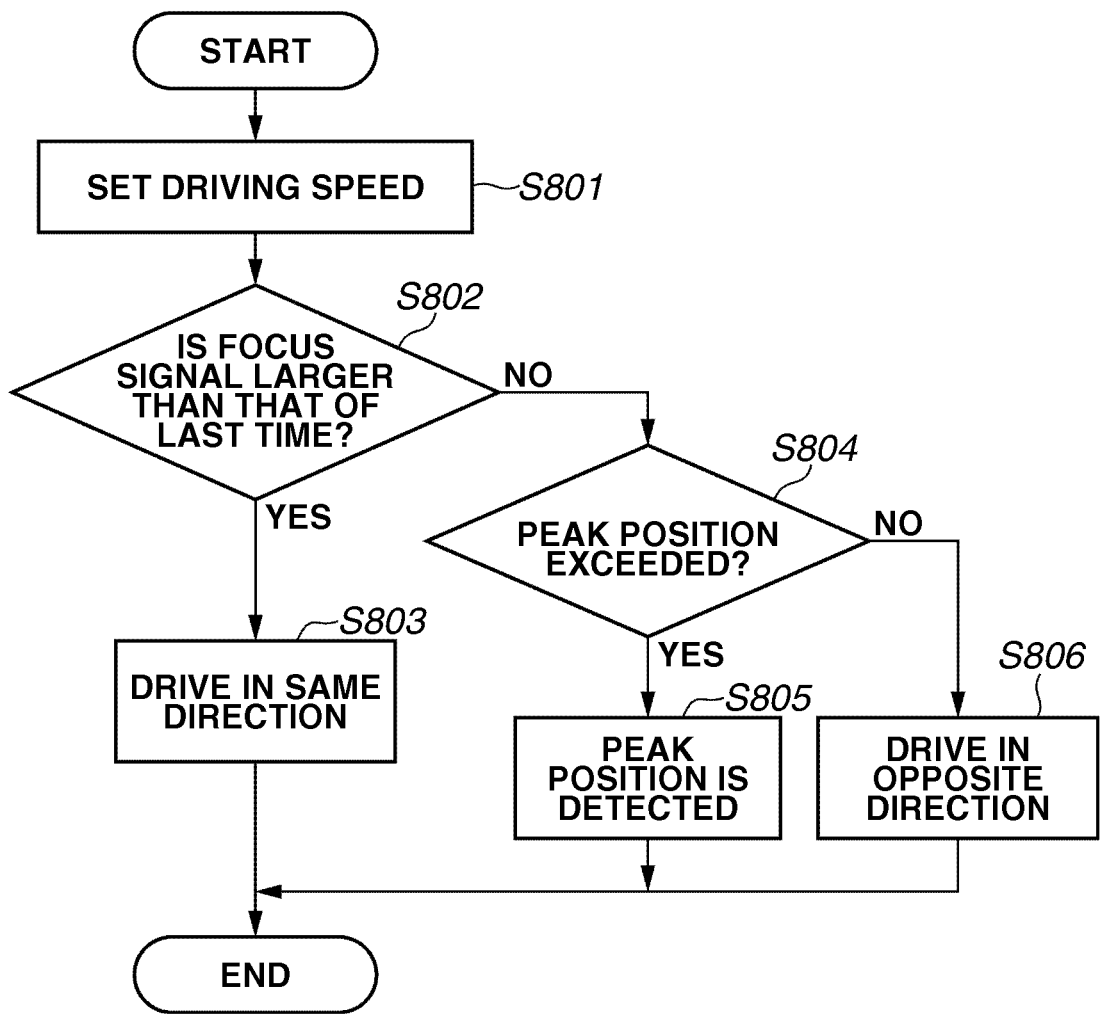
FIG. 8 is a flowchart illustrating a hill-climbing driving mode.

In FIG. 8, in step S801, the camera/AF microcomputer 114 sets a driving speed of the focus lens 105.

In step S802, the camera/AF microcomputer 114 determines whether the level of an AF evaluation value at present has increased more than that at the last time. If it has increased (YES in step S802), the processing proceeds to step S803, and if it has not increased (NO in step S802), the processing proceeds to step S804. In step S803, the camera/AF microcomputer 114 executes hill-climbing driving of the focus lens 105 in the same direction as the last time based on a speed set in step S801.

In step S804, the camera/AF microcomputer 114 determines whether the level of an AF evaluation value decreases after passing over a peak. If the AF evaluation value decreases (YES in step S804), the processing proceeds to step S805, and if the AF evaluation value does not decrease (NO in step S804), the processing proceeds to step S806. In step S805, the camera/AF microcomputer 114 determines that a peak position has been detected.

In step S806, the camera/AF microcomputer 114 executes hill-climbing driving of the focus lens 105 in a direction opposite to that of the last time based on the speed set in step 801. Note that when the step S806 is repeated in the hill-climbing driving mode means that the focus lens 105 is hunting, because the amount of change of an AF evaluation value of an object is not sufficiently obtained.

The focus lens operation in the hill-climbing driving is illustrated in FIG. 10. In FIG. 10, when the focus lens 105 is driven as indicated by an allow A, since an AF evaluation value is increasing, the camera/AF microcomputer 114 continues hill-climbing driving in the same direction. In the FIG. 10, when the focus lens 105 is driven as indicated by an arrow B, an AF evaluation value passes over a peak position and decreases. Then, the camera/AF microcomputer 114 ends hill-climbing driving operation due to a presence of an in-focus point, returns the focus lens 105 to a peak position, and then shifts to the minute driving operation. On the other hand, when an AF evaluation value is decreasing without passing over a peak position as indicated by an arrow C, the camera/AF microcomputer 114 changes a direction judging that the present direction is erroneous and then continues hill-climbing driving operation.

In this way, in focusing control by a TV-AF method, the focus lens 105 is moved while repeating restart determination, minute driving, hill-climbing driving, stop, minute driving and restart determination in this order, thereby maintaining an in-focus state by continuously maximizing an AF evaluation value.

Further, an AF evaluation value for use in the above-described focusing control can effectively be obtained from a face frame designated based on a control state.

When a direction determination mode is performed in a region that is far from the vicinity of an in-focus point, the AF accuracy can be improved by increasing the total area of an AF area. This is because stable AF is performed by using a large amount of information. In other words, in the in-focus determination mode when the minute driving is performed in the vicinity region of an in-focus point, face frames are reduced into one. This allows a desired object to be focused.

Next, a second exemplary embodiment of the present invention is described. A block diagram illustrating a system configuration of an imaging apparatus is FIG. 1, which is the same as the first exemplary embodiment. Hereafter, description will be omitted when a configuration is similar to the first exemplary embodiment.

An outline of focusing control executed in the camera/AF microcomputer 114 will be described referring to FIG. 2.

Figure 12:
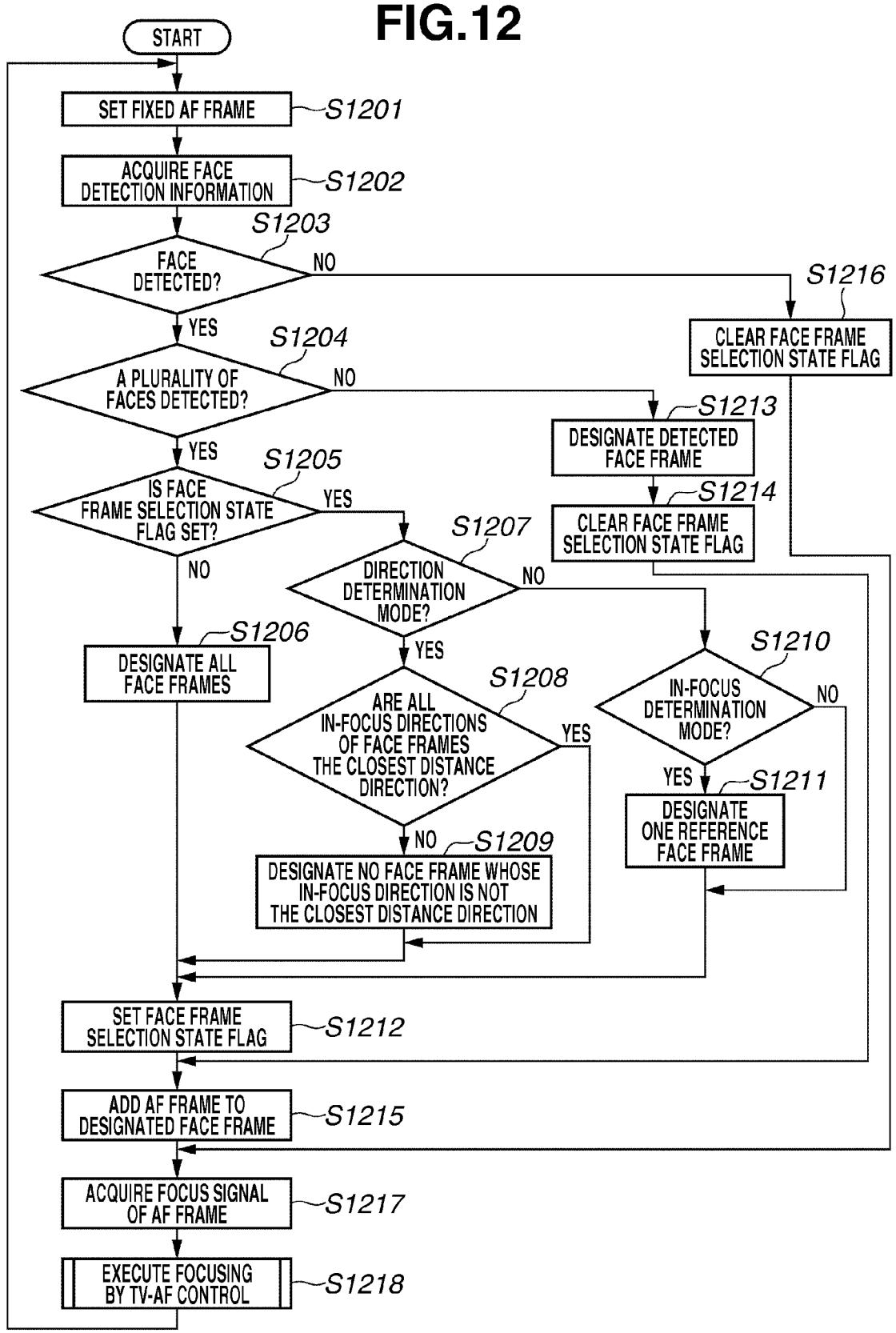
FIG. 12 is a flowchart illustrating setting of an AF area according to the second exemplary embodiment.

In FIG. 12, in step S1201, the camera/AF microcomputer 114 sets a position and a size of a fixed AF area to acquire an AF evaluation value for TV-AF control from the AF evaluation value processing circuit 112. Further, at this time, the camera/AF microcomputer 114 sets a filter factor in the AF evaluation value processing circuit 112 to construct a plurality of band-pass filters different in extraction characteristics to each other. The extraction characteristics refer to frequency characteristics of a band-pass filter. Setting in this step means that a set value of a band-pass filter in the AF evaluation value processing circuit 112 is changed.

In step S1202, the camera/AF microcomputer 114 acquires information concerning a result of face detection processing output from the face detection processing circuit 113. A face frame is set to an area corresponding to the detected face as described below. In step S1203, the camera/AF microcomputer 114 determines whether a face is detected from the information acquired in step S1202. If a face is detected (YES in step S1203), the processing proceeds to step S1204 and if a face is not detected (NO in step S1203), the processing proceeds to step S1216. In step S1204, the camera/AF microcomputer 114 determines whether a plurality of faces is detected based on the information acquired in step S1202. If a plurality of faces is detected (YES in step S1204), the processing proceeds to step S1205, and if a plurality of faces is not detected (NO in step S1204), the processing proceeds to step S1213.

In step S1205, the camera/AF microcomputer 114 determines whether a flag indicating a face frame selection state, which is set in step S1212 described below, is set. If the flag is set (YES in step S1205), the processing proceeds to step S1207 and the flag is not set (NO in step S1205), the processing proceeds to step S1206. Herein, the state of face frame selection means that some face frames are selected, each AF evaluation value of which is to be monitored, from among a plurality of detected face frames. The state of face frame selection continues over a period while the plurality of face frames is detected. In step S1206, the camera/AF microcomputer 114 designates all the detected face frames as a monitoring target of an AF evaluation value based on the information acquired in step S1202. In the case of the example in FIG. 2, all the detected face frames A, B and C are under monitoring of an AF evaluation value.

Figure 11A:
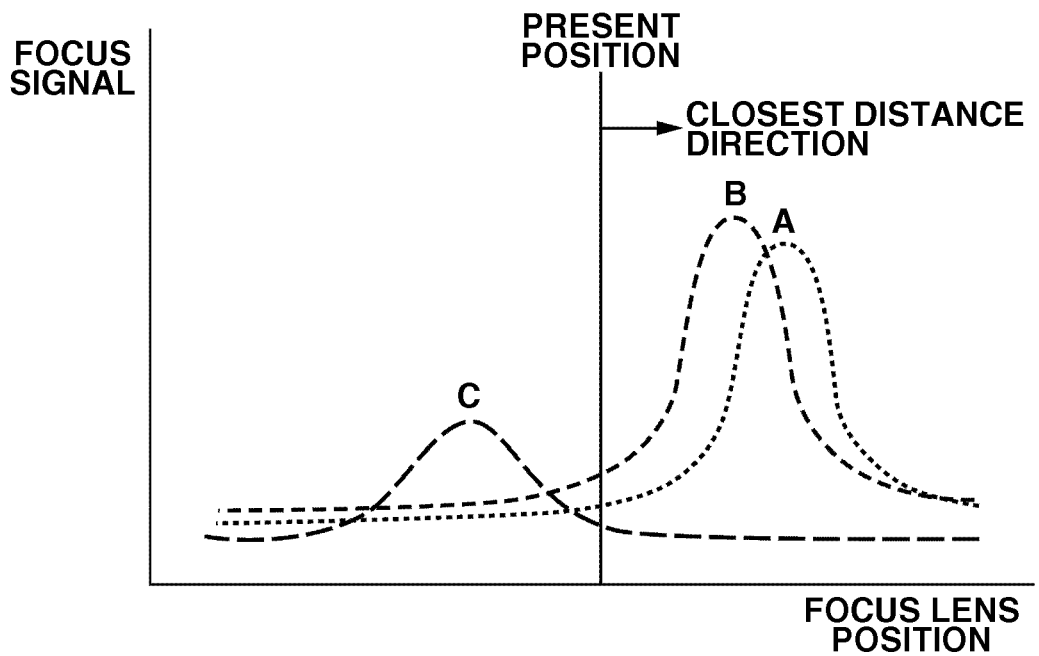
FIGS. 11A and 11B are diagrams illustrating a state of an AF evaluation value for each face frame according to a control state, according to a second exemplary embodiment of the present invention.

In step S1207, the camera/AF microcomputer 114 determines whether a control state of TV-AF is a direction determination mode. If it is the direction determination mode (YES in step S1207), the processing proceeds to step S1208, and if it is not the direction determination mode (NO in step S1207), the processing proceeds to step S1210. In step S1208, the camera/AF microcomputer 114 determines whether a direction, in which an AF evaluation value of each face frame monitored at present increases, is the closest distance direction. If the direction is a closest distance direction (YES in step S1208), the processing proceeds to step S1212, and if it is not the closest distance direction (NO in step S1208), the processing proceeds to step S1209. In step S1209, the camera/AF microcomputer 114 does not designate a face frame determined that the increasing direction of the AF evaluation value is not a closest distance direction in step S1208 as a monitoring target of an AF evaluation value hereafter. In the case of the example in FIG. 2, as illustrated in FIG. 11A, the in-focus direction of the face frames A and B is a closest distance direction, while the in-focus direction of the face frame C is not a closest distance direction. Thus, the face frame C is excluded from a monitoring target of an AF evaluation value hereafter.

Figure 11B:
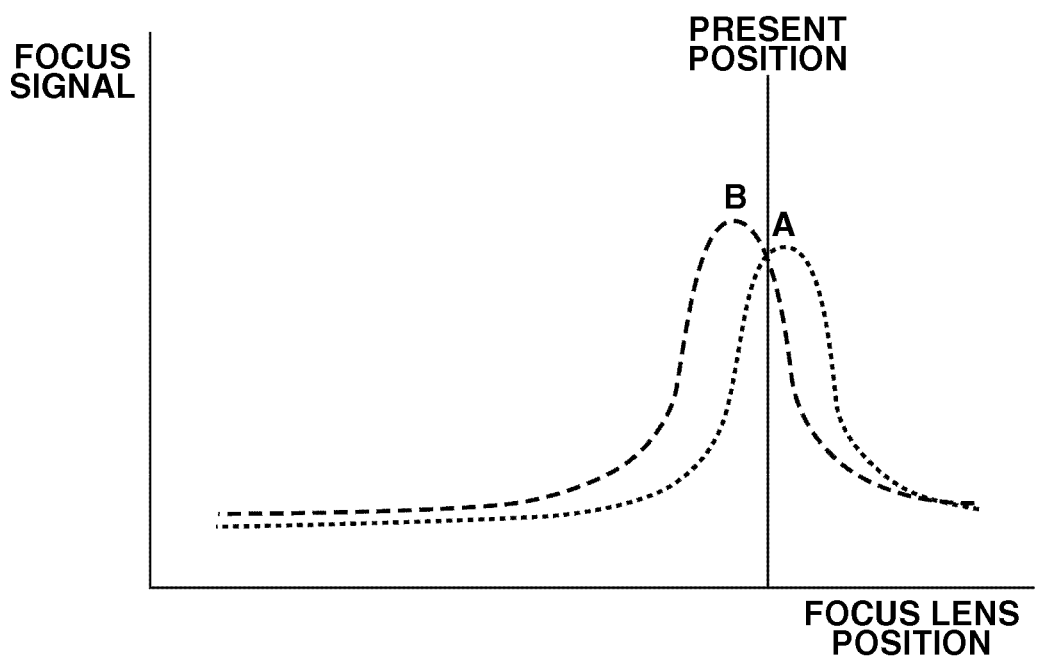

In step S1210, the camera/AF microcomputer 114 determines whether a control state of TV-AF is an in-focus determination mode. If it is the in-focus determination mode (YES in step S1210), the processing proceeds to step S1211, and if it is not the in-focus determination mode (NO in step S1210), the processing proceeds to step S1212. In step S1211, the camera/AF microcomputer 114 finally designates one reference face frame to be focused. In the case of the example in FIG. 2, as illustrated in FIG. 11B, one reference face frame is designated from face frames "A" and "B", an AF evaluation value of which is monitored at present. Herein, as a reference face frame is one that has an in-Therefore, in the example in FIG. 2, a face frame "A" is the target. That is, in the second exemplary embodiment, a main object is selected by prioritizing with a closest distance.

In step S1212, the camera/AF microcomputer 114 sets a flag indicating the above-described face frame selection state at present and keeps a state of face frame selection.

In step S1213, the camera/AF microcomputer 114 designates the detected face frame as a monitoring target of an AF evaluation value based on the information acquired in step S1202. In step S1214, the camera/AF microcomputer 114 clears a flag indicating the above-described face frame selection state and cancels a state of face frame selection.

In step S1215, the camera/AF microcomputer 114 sets an AF area to a face frame designated at present in order to acquire an AF evaluation value.

In step S1216, the camera/AF microcomputer 114 clears a flag indicating the above-described face frame selection state and cancels a state of face frame selection.

In step S1217, the camera/AF microcomputer 114 acquires an AF evaluation value of an AF area set in step S1201 or step S1215. The AF evaluation value acquired in this step is added at a predetermined ratio and then used for the following focusing control.

In step S1218, the camera/AF microcomputer 114 executes focusing by TV-AF control. Detailed operation has been described already referring to FIG. 6. Then, the processing returns to step S1201.

The difference between the first exemplary embodiment and the second exemplary embodiment lies in step S1211, that the final reference face frame designation condition to adjust focusing is designated based on the maximum area size in the first exemplary embodiment, while it is designated based on that an in-focus position is present closest to a closest distance end in the second exemplary embodiment. Other processing is similar to the first exemplary embodiment. Thus, its description is not repeated.

Thus, according to the above-described exemplary embodiment, an AF evaluation value for use in focusing control can effectively be obtained from a designated face frame according to a control state. Therefore, particularly when a motion picture is photographed, the exemplary embodiments can provide a stable focusing operation on a person of a main object intended by a photographer.

Information indicating that a focusing operation is executed based on which information of a face frame can also be displayed on the display device 109.

Further, in the exemplary embodiments, an AF area is set based on a detected face in an image screen. However, a specific object can be detected by other image detection. For example, it is also useful that an object image is cut out from a background to detect the object. In addition, a position in an image screen can be inputted from an external input unit, and a position in an image screen can be determined by detecting a line of sight of a photographer, who is viewing a finder.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-037422 filed Feb. 19, 2008, which is hereby incorporated by reference herein in its entirety.

What is claimed is:

1. A focusing apparatus comprising:
a detection unit configured to detect an object from a captured image;
a setting unit configured to set an auto-focus area in the captured image to an area corresponding to the detected object;
a focus detection unit configured to acquire an auto-focus evaluation value, which indicates a focus state of an object image, based on an output signal from the set auto-focus area; and
a determination unit configured to determine a direction to move a focus lens to focus on the detected object and to increase the auto-focus evaluation value of the detected object,
wherein, when a plurality of objects are detected by the detection unit, the determination unit conducts direction determination from the present position of the focus lens to determine whether the direction to increase the auto-focus evaluation value is a closest distance direction or an infinite distance direction for each of a plurality of auto-focus areas, and performs focus adjustment by moving the focus lens in the direction which has been determined to increase the auto-focus evaluation value for the largest number of the auto-focus areas.

2. The focusing apparatus according to claim 1,
wherein, in a case that the plurality of objects is detected by the detection unit, the determination unit conducts the direction determination to ascertain whether the direction to increase the auto-focus evaluation value is the closest distance direction or the infinite distance direction in a minute driving mode for each of the plurality of auto-focus areas, and
wherein the focus lens is moved to the closest distance direction or the infinite distance direction at a predetermined amplitude.

3. The focusing apparatus according to claim 1, wherein the object detected by the detection unit is a face.

* * * * *